United States Patent
Helle

(10) Patent No.: US 6,820,646 B2
(45) Date of Patent: Nov. 23, 2004

(54) INSTALLATION FOR MEASURING AND DISPLAYING FLUID VOLUME AND CORRESPONDING USE FOR MAINTAINING BELOW FROSTLINE AND ACCESSIBLE VALVING AND METERING EQUIPMENT

(76) Inventor: Jacky Helle, 22 Place de la Mairie, F-80531 Friville-Escarbotin (FR)

( * ) Notice: Subject to any disclaimer, the term of this patent is extended or adjusted under 35 U.S.C. 154(b) by 101 days.

(21) Appl. No.: 10/220,032

(22) PCT Filed: Mar. 1, 2001

(86) PCT No.: PCT/FR01/00606

§ 371 (c)(1),
(2), (4) Date: Aug. 21, 2002

(87) PCT Pub. No.: WO01/65015

PCT Pub. Date: Sep. 7, 2001

(65) Prior Publication Data

US 2003/0037818 A1 Feb. 27, 2003

(30) Foreign Application Priority Data

Mar. 3, 2000 (FR) .............................. 00 02744

(51) Int. Cl.$^7$ .............................................. F16K 37/00
(52) U.S. Cl. .................. 137/551; 137/355.28; 137/364; 137/371; 137/375; 251/129.04
(58) Field of Search ................................ 137/363, 364, 137/371, 375, 355.28, 551; 251/129.04

(56) References Cited

U.S. PATENT DOCUMENTS

| 983,311 | A | * | 2/1911 | McCreedy et al. ............ 73/201 |
| 3,730,213 | A | * | 5/1973 | Bates .......................... 137/364 |
| 3,935,736 | A | * | 2/1976 | Enright ........................ 73/201 |
| 3,961,528 | A | * | 6/1976 | Ford ............................ 73/201 |
| 4,691,727 | A | * | 9/1987 | Zorb et al. ................ 137/15.03 |
| 5,921,266 | A | * | 7/1999 | Meyer ....................... 137/68.14 |
| 6,634,374 | B1 | * | 10/2003 | Kondas et al. ............ 137/15.01 |

* cited by examiner

Primary Examiner—A. Michael Chambers
(74) Attorney, Agent, or Firm—Young Law Firm, P.C.

(57) ABSTRACT

The invention concerns an installation for measuring and displaying protected against risks of being frozen, comprising a fluid metering assembly (1) connected to a fluid supply pipe (2) and a fluid outlet pipe (3). Said fluid metering assembly (1) is mounted in an inspection window (4) below the frost line, said pipes extending in a trench produced in the ground (13) and connected to the inspection window (4). The metering assembly (1) is removable with or without interrupting pressurised fluid. A metering plate (8) retains flexible junction means (9, 10) connecting the intake and the outlet pipes (2, 3) to the metering assembly (1). The installation comprising the fluid metering assembly (1) is useful for maintaining protected against frost and accessible standard valves and fittings, in particular straight or coaxial meters (1).

21 Claims, 4 Drawing Sheets

INSTALLATION FOR MEASURING AND DISPLAYING FLUID VOLUME AND CORRESPONDING USE FOR MAINTAINING BELOW FROSTLINE AND ACCESSIBLE VALVING AND METERING EQUIPMENT

Installation for measurement and display of a fluid volume and corresponding use to keep valves and metering equipment frost free and accessible.

This invention relates to an installation for measurement and display of a fluid volume protected against risks of frost.

More particularly, the fluid volume measurement and display installation comprises a fluid metering assembly such as water, gas or fuel connected to a fluid inlet pipe and a fluid outlet pipe.

In known installations for measuring fluid volumes protected against risks of frost, the water meter is located either below ground level or in a chamber.

The ground acts as thermal insulation below a given depth. Only the top part is frozen in winter. This top part isolates heat in the lower part of the ground from the cold. In France, this thermal insulation is achieved after 15 days frost at a temperature of −15° C., starting from a depth of forty-five cm in the ground. Known chambers are preferably closed at the top by a removable cover to access the meter.

In all cases, the meter and fluid inlet and outlet pipes have to be protected against risks of frost.

Various techniques have been proposed for this purpose.

When the meter is above ground level, it is known how to protect it on the outside by a box, or a tank or similar system. This type of box must enable access to the meter.

According to one of these techniques, it has been proposed to protect the metering assembly by heat ducts buried in the ground and put into a condition for heat exchange.

According to another known technique, it is proposed to coat the inside of the chamber into which the water pipes lead, and the inside of the containment in which the meter is located, by elements made of an insulating material such as expanded polystyrene or polyurethane foam.

American patent U.S. Pat. No. 3,802,266 discloses a water meter with a bottom with a special shape for frost protection.

French patent 87 03453 presents a water meter installed free to pivot on a base comprising two water passages, connected to the water inlet and outlet pipes respectively. With this arrangement, the fluid inlet can be opened and closed by rotating the meter with respect to the base to bring the fluid passages in the base into line with the fluid passages in the meter, or to move them out of line.

It is known that an additional device can be added to drain the fluid, for example French parent No. 2749920 discloses a device consisting of a cylinder with two horizontal drillings (top and bottom) connected to each other through a vertical drilling in its axis, which is inserted into its valve body, the valve body itself is perforated around its circumference at its four cardinal points, in other words four times at 90° intervals, two high points, North-East, North, outlet at East, and drain outlet, two low points South-West, South, inlet at West and drain. The assembly will be actuated using a control on the surface. In the winter position, the action will be simultaneous open, close and drain of the riser. This known device is designed particularly for the cut-off valve following the water meter.

However, the use of these frost free protection means is complicated and consequently expensive.

Furthermore, in these designs in which the meter is above ground level, thermal bridges remain between the meter and the outside so that frost protection is not complete.

In the second case, when the meter is buried sufficiently deep below ground level, it is efficiently protected against frost. But other difficulties have to be overcome. It is necessary to go down into the chamber to access the meter, either to read the volume consumed, or for maintenance, to inspect the meter and parts of valves such as the non-return valves, the water sample taker for analysis and to install and check the anti-fraud system.

The purpose of the invention is firstly an installation protected against frost risks in which the fluid volume can be measured and displayed easily and quickly, while also avoiding frequently going down into a deep and narrow chamber. The invention simplifies the installations while maintaining frost free efficiency with the fluid metering assembly installed in a chamber that may or may not be thermally insulated at a frost free depth. Fluid pipes extend into a trench made in the ground and are connected to the chamber that has an upper opening closed by an inspection cover. Installation under pavements imposes small chambers. Some pavements themselves are small. In all cases, the installation is controlled by an authorization which is usually only allowed for small chambers. Consequently, the metering assembly can be removed with or without cutting off the fluid under pressure, and may or may not be installed on a meter panel holding the flexible junction means in place connecting the fluid inlet and outlet pipes to the metering assembly, the said flexible junction means being wound and consequently being capable of spreading out inside the chamber with horizontal dimensions slightly greater than the horizontal dimensions of the meter.

Thus, the dimensions of the installation will only be small on the surface. The dimensions visible on the ground surface will be the size of the cover.

To keep the installation effectively frost free while enabling display of the measurement, maintenance and checking of the meter and valve parts such as the non-return valve, the water sample taker for analysis and installation and checking of the anti-fraud system and the flexible junction means can extend at least as far as the top opening of the chamber.

In order to make a shallow chamber, the flexible junction means are flexible connecting tubes wound in the form of at least one turn with a diameter that decreases as the fluid meter is raised. Thus when the metering assembly is in the low position, the tubes do not need a sump below the fluid inlet and outlet.

According to other characteristics:
  the flexible junction means are flexible connecting tubes connected to the metering assembly, comprising one or several cut-off means, a meter and a valve that may or may not be guided by a panel and connected to the other ends to the fluid inlet and outlet pipes that may or may not be fixed directly to connectors that may or may not pass through the vertical wall of the chamber;
  the metering assembly comprises one or several cut-off means in the form of an angle bracket. These fluid flow cut off means may be either an elbow valve or a straight valve connected to an elbow or an elbow device. The metering assembly also comprises a valve in the shape of an angle bracket, and particularly an elbow or straight valve connected to an elbow fixed by a panel that guides the flexible junction means connected directly or indirectly through elbow connectors to straight connectors. This characteristic makes it possible to place valve elements below the metering assembly; this results in minimum dimensions.

The attachment of flexible junction means to crimped connectors avoids the use of seals and eliminates risks of leaks.

Another purpose of the invention is the use of an installation comprising a fluid metering assembly connected to a fluid inlet pipe and a fluid outlet pipe, this fluid metering assembly being installed in a thermally insulated chamber at a frost free depth, these pipes extending in a trench made in the ground and connected to the chamber with a top opening closed by an inspection cover, characterised in that the metering assembly is removable with or without cutting off the fluid under pressure, that may or may not be installed on a panel holding the flexible junction means connecting the fluid inlet and outlet pipes to the metering assembly, the said flexible junction means being wound and capable of extending within the chamber, and in particular conform with any of the installations described above to keep the standard valve fittings, and particularly straight or coaxial meters, frost free and accessible. This equipment is standard, which simplifies maintenance. Personnel are familiar with this equipment and it is easy to find spare parts.

Other features and advantages of the invention will become clear from the following description.

The following appended drawings are given as non-limitative examples:

Figure 1:
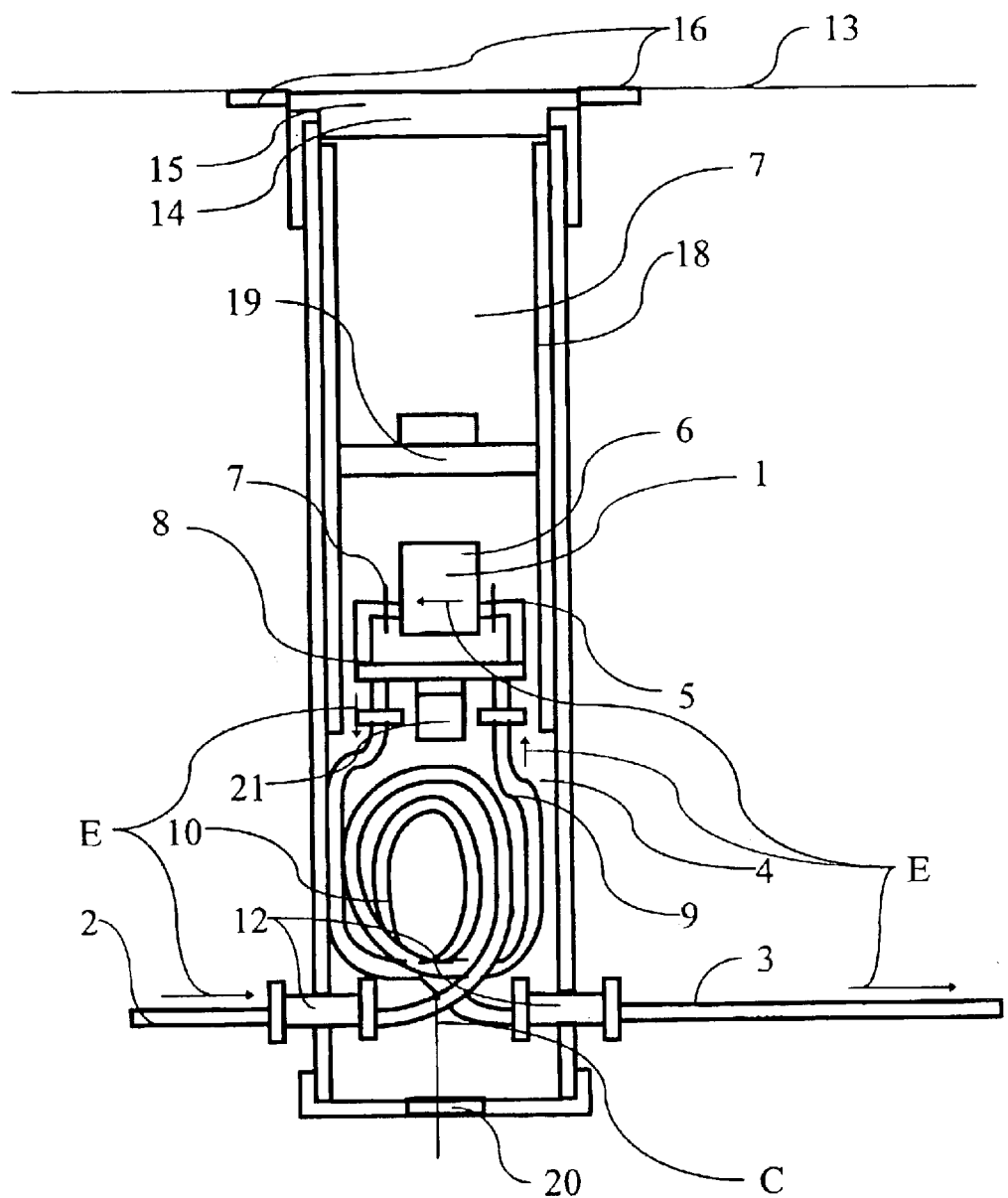
FIG. 1 is a longitudinal sectional view of an installation according to the invention with an chamber closed by a cover.

The fluid volume measurement and display installation according to the invention shown in FIG. 1 comprises a fluid metering assembly 1 connected to a fluid inlet pipe 2 and a fluid outlet pipe 3. The arrows E indicate the fluid flow direction. This fluid metering assembly 1 is installed in a thermally insulated chamber 4 at a frost free depth. The said metering assembly 1 comprises a straight valve 5 connected to an elbow and a fluid meter 6 itself connected to a straight non-return valve 7 connected to an elbow. All these valve fittings 5, 6, 7 are guided by a panel 8. The valve 5 and the non-return valve 7 are connected to fluid inlet and outlet pipes 2, 3 by flexible connecting tubes forming flexible junction means 9, 10 fixed to straight connectors 12 that pass through the vertical wall of the chamber 4. The straight connectors 12 are fixed to the pipes 2, 3 that extend in a trench made in the ground 13. The flexible connecting tubes 9, 10 are wound in the form of a turn with a variable radius of curvature that makes them capable of extending within the internal enclosure of the chamber 4. This chamber 4 has a top opening 14 closed by an inspection cover 15 that comprises a peripheral upstand 16 capable of supporting the weight of a vehicle. The chamber 4 is made of standard parts that are easy to make. The inner surface of the upper part 17 of the chamber is coated by a thermally insulating material 18, and particularly a plastic material. This upper part 7 is closed immediately above the fluid metering assembly 1 and/or its attached parts by a cover made of a thermally insulating material 19. Furthermore, the chamber 4 has a lower opening 20 that allows the heat of the ground C to rise. ??

The fluid metering assembly 1 with horizontal dimensions slightly greater than the horizontal dimensions of the meter 6 is installed on a removable panel 8 that holds the flexible connecting tubes 9, 10 in place and guides them. The removable panel 8 is lowered and fixed reversibly onto a panel support 21 that indexes the frost free depth.

According to one advantageous variant embodiment of the invention, the valve and the fluid metering assembly valve 1 are cranked into the form of a angle bracket.

Figure 2:
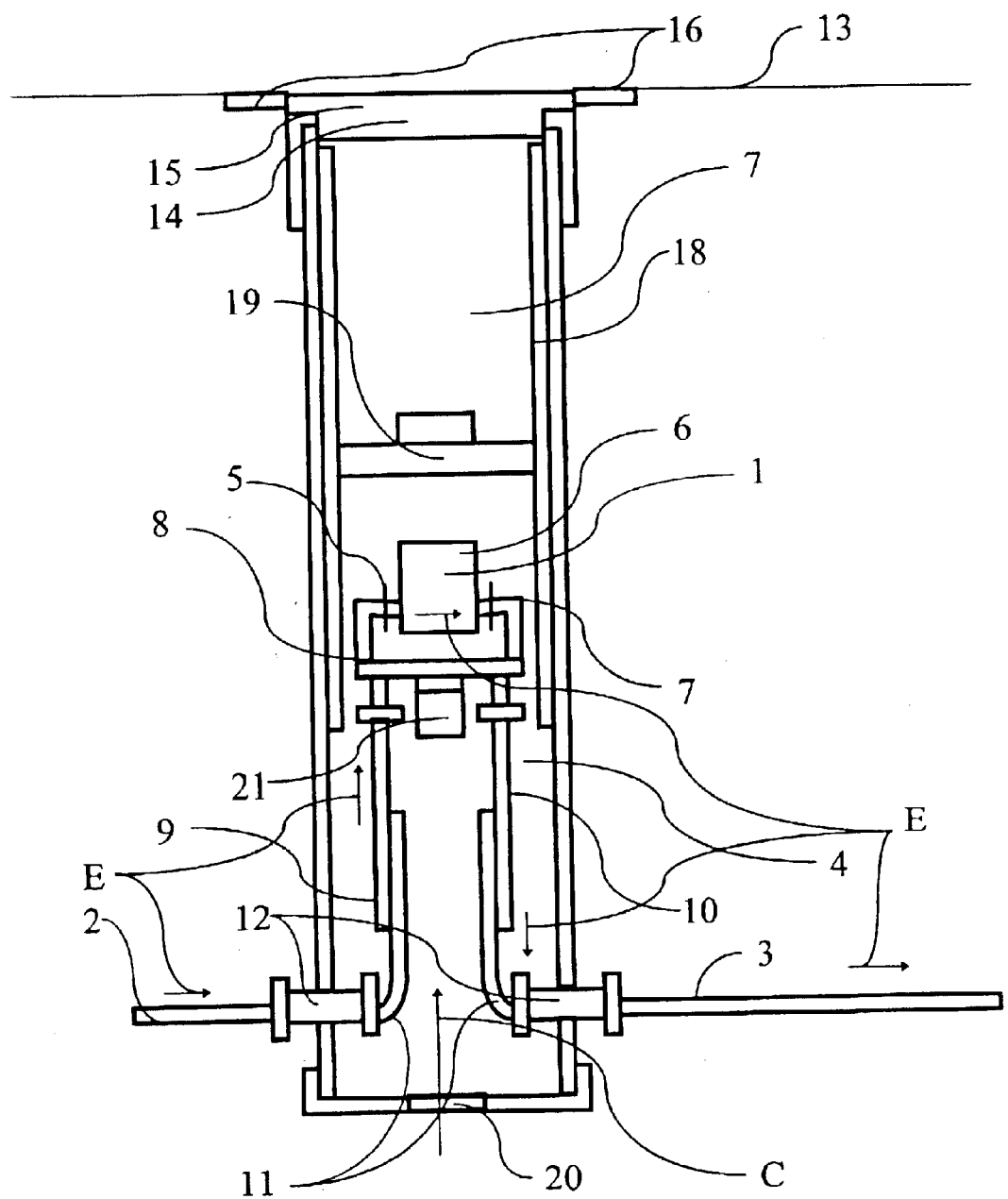
FIG. 2 is a variant of the installation according to the invention equipped with elbow connectors.

In the variant embodiment shown in FIG. 2, the flexible junction means 9, 10 are fixed indirectly through elbow connectors 11 to the straight connectors 12 that pass through the vertical wall of the chamber 4. These elbow connectors 11 are used to pivot the junction means 9, 10 in order to reverse the fluid flow direction E in the metering assembly that is installed in the other direction.

Figure 3:
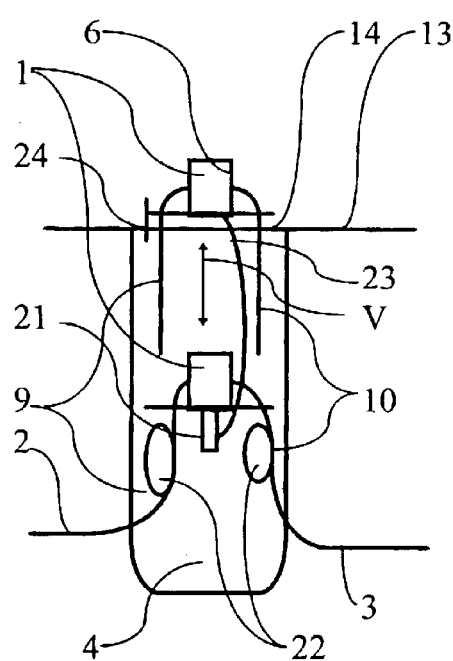
FIG. 3 is a diagrammatic view of an installation conform with FIG. 1 or 2 showing displacement of the removable meter.
Figure 4:
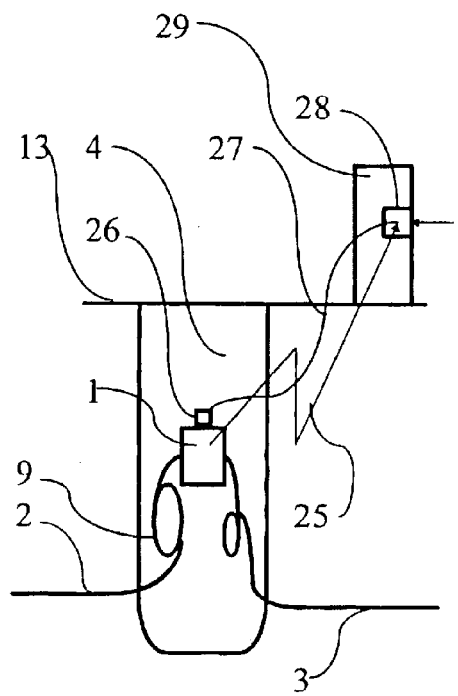
FIG. 4 is a diagrammatic view of an installation conform with FIG. 1 or 2 fitted with a read repeater box.

The metering assembly 1 of the installation according to the invention is removable as shown in FIG. 3. The metering assembly 1 can be moved vertically along the direction of the arrow V without cutting off the fluid under pressure. Each connecting tube 9, 10 is sufficiently long so that it can extend above the upper opening 14 of the chamber 4. Since the tubes 9, 10 are flexible and are wound in the form of turns 22 with a diameter that decreases as the metering assembly 1 and the meter 6 are raised, the meter 6 can be brought to the surface without stopping its operation. The vertical movement distance of the metering assembly 1 is limited at the top by an exit limiter system 23 of the metering assembly 1 that maintains the minimum radii of curvature of the turns formed by the flexible connecting tubes. The indexing panel support 21 limits the distance travelled at the lower position of the panel assembly located at the frost free depth. The panel assembly is equipped with an attachment means 24 for temporary attachment to the upper part of the chamber 4.

The installation according to the invention as shown in FIG. 3 is conform with the installation in FIGS. 1 and 2, to which a remote readout system or remote reading system 25 has been added. At least one volume recording system 26 is fitted on the top of the fluid metering assembly 1 connected to a means of transferring the recorded measurements 27 to a readout repeater box 28, and the display is placed in a wall 29. The means of transferring the recorded measurements 27 may be by wire, cellular or other. These measurements may be transmitted at specific times through a telephone call.

The space below the cover made of a thermally insulating material 19 is sufficient for the volume recording device 26 located above the meter 6 to be protected from frost under the cover 19.

Thus, to display the volume while leaving the meter 6 in the frost free position in the chamber 4, the fluid metering assembly 1 is equipped with at least one remote readout system 25 or remote reading system transferring the display of the recorded measurements to a readout repeater box 28 located above the surface of the ground 13.

FIGS. 4, 5, 6 and 7 show a diagrammatic view of an installation according to the invention with a standard depth chamber, a chamber with a depth extended by a lower extension, a chamber with a depth extended by an upper extension, and a chamber with a depth extended by a lower extension. The installation according to the invention is made with standard parts resistant to corrosion to resist aggressiveness of the ground 13. The small diameter chamber 4 may be made using a pipe.

The chamber may be extended by at least one lower extension 30 or upper extension 31 or lower and upper extensions 30, 31, in order to vary the depth of the chamber 4 and facilitate levelling as a function of the depth of the trench.

Figures 5, 6, 7, 8:
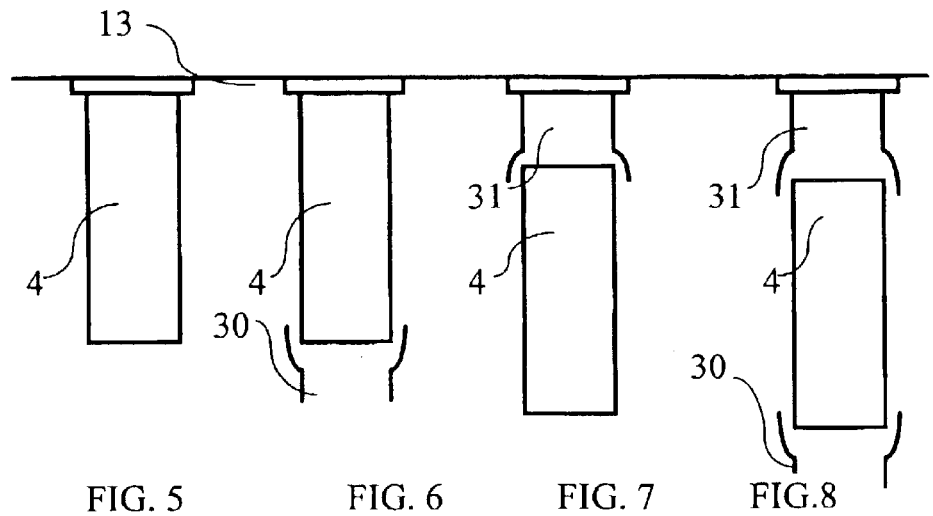
FIG. 5 is a diagrammatic view of an installation according to the invention with a standard depth chamber.
FIG. 6 is a diagrammatic view of an installation according to the invention with a chamber extended downwards by a bottom extension piece.
FIG. 7 is a diagrammatic view of an installation according to the invention with a chamber extended upwards by a top extension piece.
FIG. 8 is a diagrammatic view of an installation according to the invention with a chamber extended by bottom and top extension pieces.

According to one variant embodiment shown in FIG. 8, at least one marker post 32 is installed on top of the chamber 4. This is used to temporarily fix the meter 6 into a measurement or check position in this marker post to work with the assembly raised. The marker post 32 is fitted with an access door 33 to the fluid metering assembly 1.

Figures 9, 10:
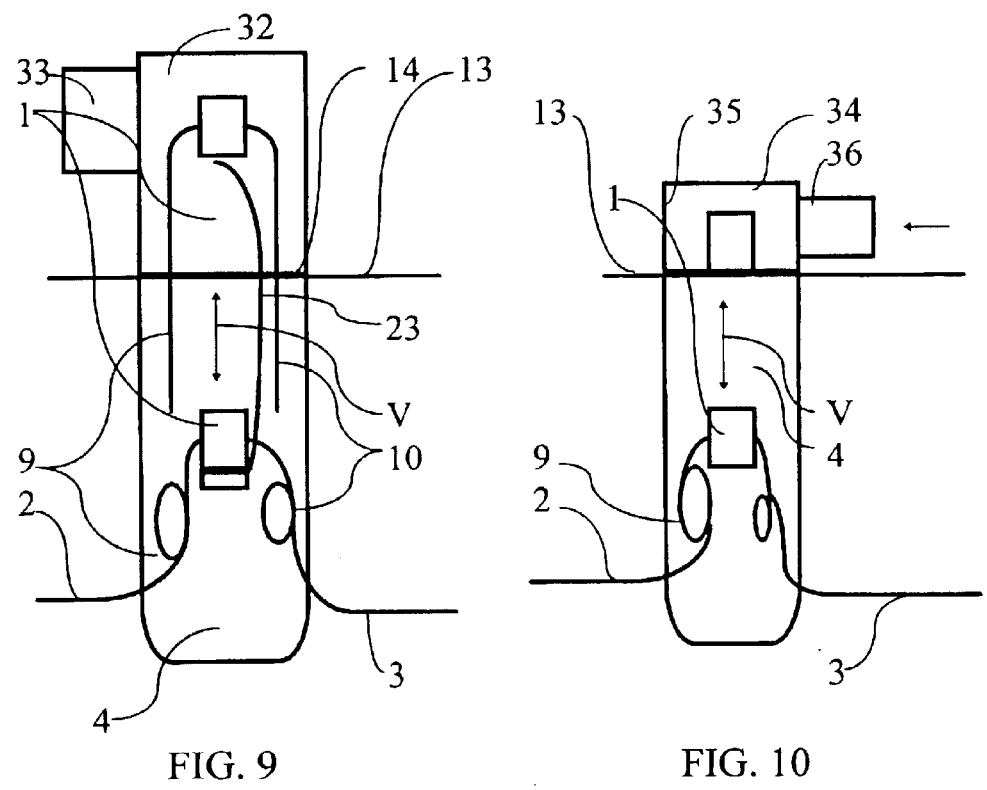
FIG. 9 is a diagrammatic view of an installation according to the invention in which the chamber is closed by a post.
FIG. 10 is a diagrammatic view of an installation according to the invention in which the chamber is closed by a box.

In the installation according to the invention shown in FIG. 10, the chamber 4 is closed by a protection box 34, in order to limit the dimensions above the ground surface 13. The meter 6 is raised to the surface and is fixed in the box for reading or maintenance. Boxes 34 that are smaller than the marker posts 32 may be used to limit the dimensions.

Use of these boxes can result in a very compact installation and small dimensions. The use of a known box does not depart from the scope of the invention. The invention can further reduce the dimensions since the compact fluid metering assembly 1 comprises an elbow valve 5 connected at one end to a fluid meter 6 itself connected to the end of an elbow non-return valve 7 guided by a panel 8. This fluid metering assembly 1 is removable and can be fully or partially retracted within the chamber 4 under the box 34. Thus, the overall height of the said box 34 may be further reduced.

The operation of the installation is described below. The chamber 4 is buried at the same level as a fluid pipe arranged in a trench. The fluid volume measurement and display installation is arranged between the pipes 2, 3 forming a part of the pipe, and the fluid passes through the metering assembly 1 fixed and indexed in frost free depth on the panel 8 of the chamber 4. The fluid arrives and leaves the metering assembly 1 through flexible tubes 9, 10 that are wound in the form of large diameter turns 22 in the low position. The direct readout dial of the meter is facing upwards. This means that the consumed volume can be read without raising the meter.

Depth indexing of the panel 8 stops the meter at the frost free depth. Therefore at the minimum depth, the volume can be displayed by leaving the meter 6 in the frost free position in the chamber 4, to access the meter 6 either to read the volume consumed or for maintenance and replacement of parts, or for checking the meter and valve parts such as the non-return valve, the water sample taker for analysis and installation and checking the anti-fraud system. The metering assembly 1 is raised at the same time as the panel 8. The diameter of the turns 22 reduces as the metering assembly 1 is raised. The maximum upwards distance of the metering assembly 1 is limited by the exit limiter system 23 that maintains the minimum radii of curvature of the turns formed by the flexible connecting tubes. Thus, the fluid flow is maintained when the metering assembly 1 is in the high position. The exit limiter system 23 of the metering assembly maintains the minimum radii of curvature of the turns formed by the flexible connecting tubes.

Maintaining the fluid flow in the high position of the metering assembly 1 means that the meter can be accessed while still in operation, particularly to record the volume consumed, for maintenance or replacement of parts, for taking water samples for analysis, checking correct operation of the meter and valve parts such as the non-return valve, and installing an anti-fraud protection system such as a seal.

During disassembly, the exit limiter system 23 prevents the flexible junction means 9, 10 from dropping to the bottom of the chamber 4.

During the work, the metering assembly 1 is locked by an attachment means 24 for temporary attachment to the top part of the chamber 4. After the work, the metering assembly 1 is lowered into the chamber 4 using the indexing means provided for the lower position of the metering assembly 1 to the frost-free depth. The turn diameter increases during lowering that conceals the metering assembly 1. This prevents the flexible tubes 9, 10 from twisting so that they fit into a sump under the chamber 4.

Although the invention has been described in relation to specific structures, it is in no way limited to them and many variants may be made such as different combinations of embodiments shown on drawings or described above or the thermal insulation material 18 may be eliminated, the meter 6 being kept frost-free by its depth in the chamber 4 without departing from the scope of the invention.

PARTS LIST 1 fluid metering assembly
2 fluid inlet pipe
3 fluid outlet pipe
5 cut-off means
6 fluid meter
7 non-return valve
8 panel
9 flexible junction means
10 flexible junction means
11 elbow connectors
12 straight connectors
13 ground
14 top opening of the chamber
15 inspection cover
16 peripheral edge of the cover
17 top part of the chamber
18 thermal insulation material
19 cover made of a thermally insulating material
20 chamber lower opening
21 panel support
22 turns
23 exit limiter system
24 attachment means
25 remote readout system or remote reading system
26 volume recording system
27 recorded measurement transfer means
28 readout repeater box
29 wall
30 lower extension
31 upper extension
32 marker post
33 access door to the fluid metering assembly
34 protection cover
35 body
C ground heat
E fluid flow direction
V vertical displacement of the metering assembly.

The sole purpose of the reference symbols inserted in the technical characteristics mentioned in the claims is to facilitate understanding of these claims and they in no way limit their scope.

What is claimed is:

1. A fluid volume measurement and display device that is protected against frost, comprising:

interior device surfaces that define a chamber and a top chamber opening;

a removable fluid metering assembly that includes a fluid meter, the fluid metering assembly being disposed in the chamber;

a fluid inlet pipe coupled to the fluid metering assembly;

a fluid outlet pipe coupled to the fluid metering assembly;

an inspection cover configured to close the top chamber opening;

flexible junction means configured to travel within the chamber and to connect the inlet and outlet pipes to the removable fluid metering assembly, the flexible junction means defining at least one winding having a radius of curvature that varies as the flexible junction means travels within the chamber.

2. The fluid volume measurement and display device of claim 1, wherein a portion of the at least one winding defines a horizontal axis.

3. The fluid volume measurement and display device of claim 2, wherein the radius of curvature of the at least one winding defines a horizontal dimension that is greater than a horizontal dimensions of the fluid meter.

4. The fluid volume measurement and display device of claim 1, wherein the fluid meter is disposed in a re-entrant position in the chamber.

5. The fluid volume measurement and display device of claim 1, wherein the device is configured to installed such that the chamber is thermally insulated at a frost-free depth underground.

6. The fluid volume measurement and display device of claim 1, wherein the removable fluid metering assembly is configured to be removable without cutting off a flow of a fluid within the inlet and outlet pipes.

7. The fluid volume measurement and display device of claim 1, further including a metering panel, the metering panel supporting the flexible junction means.

8. The fluid volume measurement and display device of claim 1, wherein the flexible junction means includes flexible connecting tubes and wherein the variable radius of curvature of the flexible connecting tubes decreases as the removable fluid metering assembly is lifted externally out of the chamber to read the fluid meter.

9. The fluid volume measurement and display device of claim 1, further comprising a thermally insulating cover disposed within the chamber between the removable fluid metering assembly and the top chamber opening.

10. The fluid volume measurement and display device of claim 8, further comprising at least one cut-off means coupled to the flexible junction means and to at least one of the inlet and outlet pipes.

11. The fluid volume measurement and display device of claim 1, wherein the fluid meter includes a direct readout dial that faces the chamber opening.

12. The fluid volume measurement and display device of claim 1, wherein the removable fluid metering assembly includes cut-off means coupled to a non-return valve coupled to a panel that is configured to guide the flexible junction means within the chamber.

13. The fluid volume measurement and display device of claim 1, further comprising connectors coupled to the flexible junction means, the connectors including at least one of elbow and straight connectors, the connectors providing an opening into the chamber for the inlet and outlet pipes.

14. The fluid volume measurement and display device of claim 1, wherein the flexible junction means is configured to travel within the chamber toward the top chamber opening.

15. The fluid volume measurement and display device of claim 1, further conspiring an exit limiter system configured to limit a travel of the flexible junction means within the chamber and to limit a minimum radius of curvature of the at least one winding to avoid impeding fluid flow.

16. The fluid volume measurement and display device of claim 1, further comprising an attachment means configured for temporary attachment of the removable fluid metering assembly to the top chamber opening.

17. The fluid volume measurement and display device of claim 5, further comprising an indexing means configured to indicate a lower position of the removable fluid metering assembly at the frost-free depth underground.

18. The fluid volume measurement and display device of claim 5, further comprising at least one of an upper extension enabling the device to adapt to above-ground surfaces.

19. The fluid volume measurement and display device of claim 5, further including a lower extension configured to enable the frost-free depth of the chamber to be varied.

20. The fluid volume measurement and display device of claim 1, further comprising at least one of a marker post and a box configured to be fitted to the top chamber opening.

21. The fluid volume measurement and display device of claim 1, further comprising a readout repeater box and a remote readout system coupled to the removable fluid metering assembly, the remote readout system being configured to enable remote reading of measurements made by the removable fluid metering assembly to the readout repeater box.

* * * * *